(12) United States Patent
Watanabe et al.

(10) Patent No.: US 12,360,326 B2
(45) Date of Patent: Jul. 15, 2025

(54) CASSETTE CASE WITH INTEGRATED ADAPTER FOR OPTICAL CONNECTOR

(71) Applicant: SANWA DENKI KOGYO CO., LTD., Tokyo (JP)

(72) Inventors: Yasuhiro Watanabe, Tokyo (JP); Takashi Sato, Tokyo (JP)

(73) Assignee: SANWA DENKI KOGYO CO., LTD., Tokyo (JP)

( * ) Notice: Subject to any disclaimer, the term of this patent is extended or adjusted under 35 U.S.C. 154(b) by 246 days.

(21) Appl. No.: 17/979,137

(22) Filed: Nov. 2, 2022

(65) Prior Publication Data
US 2024/0004155 A1 Jan. 4, 2024

(30) Foreign Application Priority Data

Jun. 30, 2022 (JP) ................................. 2022-106338

(51) Int. Cl.
*G02B 6/44* (2006.01)
*G02B 6/38* (2006.01)

(52) U.S. Cl.
CPC ......... *G02B 6/4453* (2013.01); *G02B 6/3825* (2013.01); *G02B 6/3879* (2013.01); *G02B 6/3897* (2013.01)

(58) Field of Classification Search
CPC .. G02B 6/4453; G02B 6/3825; G02B 6/3879; G02B 6/3897
See application file for complete search history.

(56) References Cited

U.S. PATENT DOCUMENTS

| | | | |
|---|---|---|---|
| 2010/0296790 A1* | 11/2010 | Cooke .................. | G02B 6/4455 385/135 |
| 2011/0222819 A1* | 9/2011 | Anderson ............ | G02B 6/3807 385/78 |
| 2017/0192191 A1 | 7/2017 | Dagley et al. | |

(Continued)

FOREIGN PATENT DOCUMENTS

| | | |
|---|---|---|
| CN | 108415135 A | 8/2018 |
| JP | 2020067602 A | 4/2020 |
| KR | 101728814 B1 | 4/2017 |

OTHER PUBLICATIONS

ESSR cited in corresponding European Patent Application No. 22205727.5 issued on Aug. 29, 2023.

*Primary Examiner* — Michelle R Connelly
*Assistant Examiner* — Marc E Manheim
(74) *Attorney, Agent, or Firm* — BACON&THOMAS,PLLC

(57) ABSTRACT

An adapter main body is formed by an upper wall plate portion, and a plurality of side wall plate portions vertically placed between both ends of and between the upper wall plate portion. A lower end of each of the side wall plate portions in the adapter main body is fixed to an upper surface of a front end of a bottom plate in a case main body portion of the cassette case, thereby forming a multiple type adapter in which a plurality of adapter single bodies are continuously provided in the upper surface of the bottom plate, the adapter single body having an approximately quadrangular tubular shape in a front view, and a cable accommodating portion of an optical fiber is formed in the cassette case main body portion at the rear of the adapter main body. Therefore, the compact and lightweight adapter can be easily formed.

10 Claims, 17 Drawing Sheets

(56) References Cited

U.S. PATENT DOCUMENTS

| | | | | |
|---|---|---|---|---|
| 2019/0339465 A1* | 11/2019 | Murray | ................ | G02B 6/4478 |
| 2020/0310061 A1* | 10/2020 | Livingston | ........... | G02B 6/4452 |
| 2021/0080657 A1* | 3/2021 | Jones | .................... | G02B 6/3869 |
| 2021/0215886 A1* | 7/2021 | Lee | ...................... | G02B 6/3885 |
| 2022/0120980 A1* | 4/2022 | Holmberg | ............ | G02B 6/3874 |

* cited by examiner

CASSETTE CASE WITH INTEGRATED ADAPTER FOR OPTICAL CONNECTOR

TECHNICAL FIELD

The present invention relates to a cassette case with integrated adapter of an optical connector in which an adapter is integrally coupled and fixed to a cassette case.

BACKGROUND ART

In the past, this kind of cassette case with integrated adapter for the optical connector is integrally assembled by inserting and attaching an adapter with shutter to a leading end of an opening section of a cassette case (box).

For example, as shown in Patent Literature 1, in a case where three two-core adapters are arranged, these three adapters are first inserted into an opening section of a casing, collectively. At this time, two small holes are disposed on each of both upper and lower surfaces in the vicinity of the opening section of the casing, and shorter segments of right and left latches are engaged with them (refer to FIG. 18 of Patent Literature). Thus, three adapters are attached to the opening sections of the casing in parallel with each other.

Further, as shown in Patent Literature 2, there has been known an optical fiber member in which a small hole is disposed on an upper surface of a front end of a composite optical fiber module, and a segment formed in an upper wall of an adapter is engaged therewith (refer to FIGS. 1A, 8, 19A and 21A of Patent Literature 2).

CITATION LIST

Patent Literature

Patent Literature 1: Japanese Patent Unexamined Publication No. 2020-067602 (refer to FIG. 17)
Patent Literature 2: US 2017/0192191 (refer to FIGS. 1A, 8, 19A and 21A)

SUMMARY OF INVENTION

Technical Problem

However, in the Patent Literature 1 mentioned above, as shown in FIG. 17, three quadrangular tubular adapters are collectively inserted into a leading end of an opening section of a quadrangular tubular casing, and shorter segments of right and left latches are engaged with two small holes in both upper and lower surfaces of the opening section of the casing. Therefore, the segment tends to be detached from the small hole, and the quadrangular tubular adapter corresponding to a conventional product is attached to the opening section of the quadrangular tubular casing, so that there is a disadvantage that the structure is increased in size and weight as a whole when assembling.

Further, in the Patent Literature 2, a segment in an upper surface of a quadrangular tubular adapter is engaged with a small hole in a leading end upper surface of a composite optical fiber module. Therefore, there is a defect that a housing of the adapter and a case main body portion of the composite optical fiber module tend to be disconnected, and a strength thereof can not be sufficiently secured when assembling.

The present invention is devised while taking into consideration the conventionally existing various circumstances as described above, and an object of the present invention is to provide a cassette case with an integrated adapter for an optical connector, in which a compact and lightweight adapter integrated with a cassette case can be easily formed by fixing a lower end of a side wall plate portion of the adapter to a bottom plate of the cassette case, enabling the adapter to be securely connected to the cassette without risk of being disconnected.

Solution to Problem

In order to achieve the object mentioned above, in the present invention, an adapter main body is formed by an upper wall plate portion, and a plurality of side wall plate portions which are vertically placed at regular intervals in such a manner as to define a plurality of plug insertion ports in both ends and inner sides thereof, a lower end of each of the side wall plate portions in the adapter main body is fixed to an upper surface of a front end of a bottom plate in a case main body portion of a cassette case, thereby forming a multiple type adapter in which a plurality of adapter single bodies are connected in a lateral direction of the upper surface of the bottom plate, the adapter single body having an approximately quadrangular tubular shape in a front view, and a cable accommodating portion of an optical fiber is formed in a cassette case main body at the rear of the adapter.

The upper wall plate portion of the adapter main body is formed into a rectangular plate shape having approximately the same width as a transverse width in the case main body portion, and the plurality of side wall plate portions in both the right and left ends and between them vertically placed in the upper wall plate portion are formed by a thick plate wall material which can fit a plurality of coupling means fixing an opening section of a lower surface in the adapter main body and a bottom plate of the case main body portion.

The coupling means employs a coupling plate which is provided in a lower portion thereof with a locking portion fixing each of the side wall plate portions of the adapter main body to the bottom plate of the case main body portion.

An opening for enabling the coupling plate to be pushed into the rectangular plate shaped upper wall plate portion from above is formed just above each of the thick plate wall materials, and a fitting hole for the coupling plate is provided in a penetrating manner within each of the thick plate wall materials, the fitting hole communicating with the opening in a vertical disposition.

A locking hole is provided in a penetrating manner in the bottom plate of the case main body portion, the locking hole to which a locking portion below the coupling plate pushed into the fitting hole of each of the thick plate wall materials via the opening of the upper wall plate portion is locked and fixed.

The coupling plate is formed into an approximately C-shaped form by a horizontal bar and a pair of arms vertically placed in front of both ends of the horizontal bar, and is provided in lower ends of the pair of arms with a locking portion locked and fixed to the locking hole of the bottom plate in the case main body portion.

Each of the locking portions in the lower ends of the pair of arms in the coupling plate is formed by an outward locking claw.

A step portion is formed in the locking hole of the bottom plate in the case main body portion in such a manner that an outward locking claw provided in the lower ends of the pair of arms in the coupling plate is locked and fixed thereto.

A board portion mounting the adapter main body is provided in a front upper surface of the bottom plate in the case main body portion, and a plurality of mating grooves in the lower ends of the side wall plate except the thick plate wall materials of the adapter main body are provided at predetermined intervals in a transverse direction of the upper surface of the board portion.

A plurality of rib projections are provided in a leading end of the case main body portion, and the rib projections are mated to a plurality of mating holes formed below a front end of the adapter main body and are formed to be integrated with the case main body portion.

Second projections are continuously provided below the rib projections, and are formed in such a manner as to be locked in a receiving and holding manner below a lower wall surface than the mating hole of the adapter main body.

The adapter can be applied to adapters for SC type, MU type and MPO type optical connectors in addition to an LC type adapter.

The cassette case is formed by an electrically conductive material such as a metal material as a whole.

Effect of Invention

According to the present invention, a compact and lightweight multiple type adapter integrated with a cassette case can be easily formed at a low cost by fixing the lower end of the side wall plate portion in the adapter to the bottom plate of the cassette case, and the adapter main body and the case main body portion of the cassette can be connected so that both the elements are not disconnected, by securing the strength when assembling the adapter main body and the case main body portion of the cassette case. Therefore, various security systems can be constructed.

Thus, in the present invention, the adapter main body is formed by the upper wall plate portion, and a plurality of side wall plate portions which are vertically placed at regular intervals in such a manner as to define a plurality of plug insertion ports in both ends and inner sides thereof, the lower end of each of the side wall plate portions in the adapter main body is fixed to the upper surface of the front end of the bottom plate in the case main body portion of the cassette case, thereby forming the multiple type adapter in which a plurality of adapter single bodies are connected in the lateral direction of the upper surface of the bottom plate, the adapter single body having the approximately quadrangular tubular shape in a front view, and the cable accommodating portion of the optical fiber is formed in the cassette case main body at the rear of the adapter. Therefore, a compact and lightweight multiple type adapter can be easily formed at a low cost on the basis of connection between the front end of the bottom plate in the case main body portion and the lower surface opening sections of the plurality of side wall plate portions vertically placed in the upper wall plate portion. Further, an extra length portion of the optical fiber cable can be collected like a coil and accommodated in the cable accommodating portion of the cassette case main body without being entangled.

The upper wall plate portion of the adapter main body is formed into the rectangular plate shape having approximately the same width as the transverse width in the case main body portion, and the plurality of side wall plate portions in both the right and left ends and between them vertically placed in the upper wall plate portion are formed by the thick plate wall material which can fit a plurality of coupling means fixing the opening section of the lower surface in the adapter main body and the bottom plate of the case main body portion. Therefore, it is possible to securely and firmly fix to the bottom plate of the case main body portion by the coupling means, and it is possible to achieve a firm connecting structure in such a manner that both the adapter main body and the case main body are not detached when assembling them.

The coupling means employs the coupling plate which is provided in the lower portion thereof with the locking portion fixing each of the side wall plate portions of the adapter main body to the bottom plate of the case main body portion. Therefore, it is possible to securely and firmly couple and fix both the members of the adapter main body having the opening section in the lower surface thereof and the case main body portion by the locking portion of the coupling plate.

The opening for enabling the coupling plate to be pushed into the rectangular plate shaped upper wall plate portion from above is formed just above each of the thick plate wall materials, and the fitting hole for the coupling plate is provided in a penetrating manner within each of the thick plate wall materials, the fitting hole communicating with the opening in a vertical disposition. Therefore, it is possible to securely and firmly couple and fix the adapter to the bottom plate of the case main body portion while closing the opening section in the lower surface of the adapter main body by pushing each of the coupling plates into the fitting hole within each of the thick plate wall materials.

The locking hole is provided in a penetrating manner in the bottom plate of the case main body portion, the locking hole to which the locking portion below the coupling plate pushed into the fitting hole of each of the thick plate wall materials via the opening of the upper wall plate portion is locked and fixed. Therefore, the locking portion below the coupling plate is locked and fixed to the locking hole of the bottom plate, and it is accordingly possible to securely and firmly couple and fix to the bottom plate of the case main body portion while closing the opening section in the lower surface of the adapter main body.

The coupling plate is formed into an approximately C-shaped form by the horizontal bar and a pair of arms vertically placed in front of both ends of the horizontal bar, and is provided in the lower ends of the pair of arms with the locking portion locked and fixed to the locking hole of the bottom plate in the case main body portion. Therefore, it is possible to prevent the coupling plate from being pulled out upward by a pair of arms having the locking portion in the lower end of the coupling plate, and it is possible to securely and firmly couple and fix to the case main body portion while closing the opening section in the lower surface of the adapter main body.

Each of the locking portions in the lower ends of the pair of arms in the coupling plate is formed by the outward locking claw. Therefore, it is possible to significantly improve the coupling strength in such a manner that both the opening section in the lower surface of the adapter main body and the case main body portion are not disconnected when assembling both the members.

The step portion is formed in the locking hole of the bottom plate in the case main body portion in such a manner that the outward locking claw provided in the lower ends of the pair of arms in the coupling plate is locked and fixed thereto. Therefore, the locking claw is locked and fixed to the step portion, and it is accordingly possible to sufficiently secure the integration between the opening section in the lower surface of the adapter main body and the case main body portion and securely prevent the disconnection thereof.

The board portion mounting the adapter main body is provided in the front upper surface of the bottom plate in the case main body portion, and a plurality of mating grooves in the lower ends of the side wall plate except the thick plate wall materials of the adapter main body are provided at predetermined intervals in a transverse direction of the upper surface of the board portion. Therefore, the adapter main body can be mated to the bottom plate of the case main body portion at an accurate position, and it is possible to effectively prevent the adapter main body from being disconnected from the bottom plate of the case main body portion even if shock or pressure is applied from an external portion.

Further, the front upper surface of the bottom plate in the case main body portion is formed as a thick plate by the board portion. Therefore, it is possible to effectively prevent the bending and warpage of the portion from being generated, and it is possible to always attach the adapter main body to the case main body portion in a stable state.

A plurality of rib projections are provided in the leading end of the case main body portion, and the rib projections are mated to a plurality of mating holes formed below the front end of the adapter main body and are formed to be integrated with the case main body portion. Therefore, it is possible to accurately position the adapter main body with respect to the bottom plate of the case main body portion when assembling the optical connector, and it is possible to reduce a gap between an inclined surface at the rear of the rib projection and the shutter shaft in a case where the adapter with shutter is employed. Thus, an axial position of the shutter can be stably retained, and it is accordingly possible to eliminate variation in an opening and closing level of the shutter, thereby achieving a smooth shutter opening and closing operation. In addition, it is possible to reduce the gap between the opening section in the lower end of the adapter main body and the case main body portion. Thus, the dust resistance is increased, and it is possible to firmly couple and fix both the members while preventing the adapter main body from moving in a lateral direction (stopping rattle).

The second projections are continuously provided below the rib projections, and are formed in such a manner as to be locked in a receiving and holding manner below the lower wall surface than the mating hole of the adapter main body. Therefore, an effect of sufficiently suppressing the action from the lower side can be achieved by the locking force in a receiving and holding manner of the second projection in addition to the function of the rib projection.

The adapter can be applied to the adapters for SC type, MU type and MPO type optical connectors in addition to the LC type adapter. Therefore, it is possible to achieve a versatile cassette case with integrated adapter for an optical connector.

The cassette case is formed by the electrically conductive material such as the metal material as a whole. Therefore, it is possible to manufacture a product having a high shielding performance for an electromagnetic noise.

BRIEF DESCRIPTION OF DRAWINGS

FIGS. 2A and 2B show an example of the cassette case with integrated adapter for the optical connector, in which FIG. 2A is a perspective view of a case main body portion, and FIG. 2B is a perspective view in which an end portion of the case main body portion is partly enlarged.

FIGS. 3A and 3B show an example of the cassette case with integrated adapter for the optical connector, in which FIG. 3A is a plan view of the cassette main body portion, and FIG. 3B is a bottom elevational view of the case main body portion.

FIGS. 4A to 4D show an example of an adapter main body, in which FIG. 4A is a plan view, FIG. 4B is a front elevational view, FIG. 4C is a bottom elevational view, and FIG. 4D is a back elevational view.

FIGS. 5A and 5B show an example of the adapter main body, in which FIG. 5A is a right side elevational view, and FIG. 5B is a left side elevational view.

FIGS. 6A and 6B show an example of the adapter main body, in which FIG. 6A is a cross sectional view along a line A-A in FIG. 4, and FIG. 6B is a cross sectional view along a line B-B in FIG. 4.

FIGS. 7A and 7B show an example of the cassette case with integrated adapter for the optical connector, in which FIG. 7A is a plan view, and FIG. 7B is a bottom elevational view.

FIGS. 8A to 8C show an example of the cassette case with integrated adapter for the optical connector, in which FIG. 8A is a front elevational view, FIG. 8B is a back elevational view, and FIG. 8C is a side elevational view.

FIGS. 10A to 10C show an example of a coupling plate (coupling means), in which FIG. 10A is a side elevational view, FIG. 10B is a front elevational view, and FIG. 10C is a plan view.

FIGS. 15A to 15C show an example of the cassette case with integrated adapter for the optical connector, in which FIG. 15A is a cross sectional view of a state before the coupling plate (coupling means) is pushed into a fitting hole of each of the thick plate wall materials via an opening of an upper wall plate portion of the adapter main body, FIG. 15B is a cross sectional view of a state in the process of pushing locking portions in lower ends of a pair of arms into the fitting holes of the respective thick plate wall materials, and FIG. 15C is a cross sectional view of a state in which outward locking claws (locking portions) in the lower ends of a pair of arms are locked and fixed to step portions of the locking holes of the bottom plates in the case main body portion.

FIGS. 17A and 17B show an example of the adapter main body, in which FIG. 17A is a perspective view showing a state before the coupling plate (coupling means) is fitted to a fitting hole of an upper wall plate portion in a quadruple type adapter main body in such a manner as to partly cut an end surface, and FIG. 17B is a perspective view showing a state in which the coupling plate (coupling means) is fitted to the fitting hole of the upper wall plate portion in the quadruple type adapter main body in such a manner as to partly cut the end surface.

FIGS. 21A and 21B show the adapter main body, in which FIG. 21A is an enlarged cross sectional view of the adapter main body after assembling, and FIG. 21B is an enlarged partial cross sectional view at a position of a shutter shaft thereof.

FIGS. 22A and 22B show a conventional adapter main body, in which FIG. 22A is an enlarged partial cross sectional view of the adapter main body after assembling, and FIG. 22B is an enlarged partial cross sectional view at a position of a shutter shaft thereof.

DESCRIPTION OF EMBODIMENTS

A description will be in detail given below of an embodiment of a cassette case with integrated adapter for an optical connector according to the present invention with reference to the accompanying drawings.

The cassette case with integrated adapter for the optical connector is described for an LC type adapter in the present embodiment, however, can be applied to the other SC type, MU type and MPO type adapters. Further, in the present embodiment, the description is given of a shuttered cassette case with integrated adapter for an optical connector, however, a shutterless cassette case with integrated adapter for an optical connector may be employed.

Figure 1:
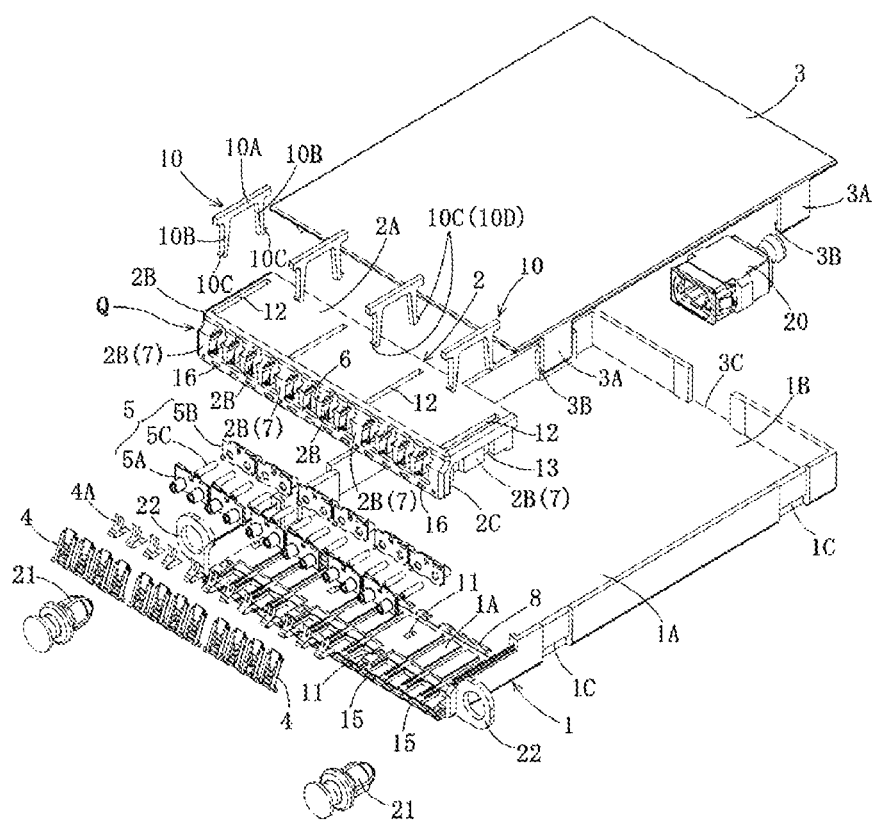
FIG. 1 is an exploded perspective view of a cassette case with integrated adapter for an optical connector and shows an embodiment for carrying out the present invention.

As shown in FIG. 1, a shuttered cassette case with integrated adapter for an optical connector according to the present embodiment is provided with a case main body portion 1 of the cassette case, an adapter main body 2 which is fixed to an upper surface in a front end of a bottom plate 1A in the case main body portion 1, and a case cover 3 which covers an upper surface of a cable accommodating portion 1B of an optical fiber at the rear of the case main body portion 1. The case cover 3 covers the upper surface of the cable accommodating portion 1B by hooks 3B of vertical leg portions 3A at four corners thereof being locked and fixed to locked portions 10 at four corners at the rear of the case main body portion 1.

Figure 9:
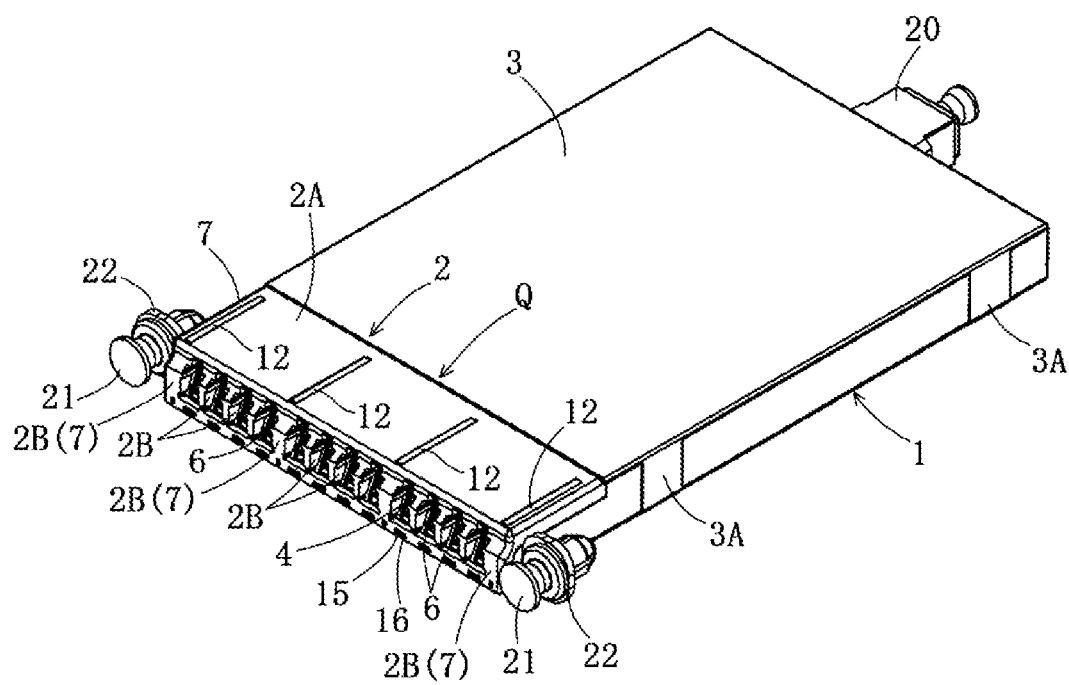
FIG. 9 is an overall perspective view of the cassette case with integrated adapter for the optical connector.
Figure 16:
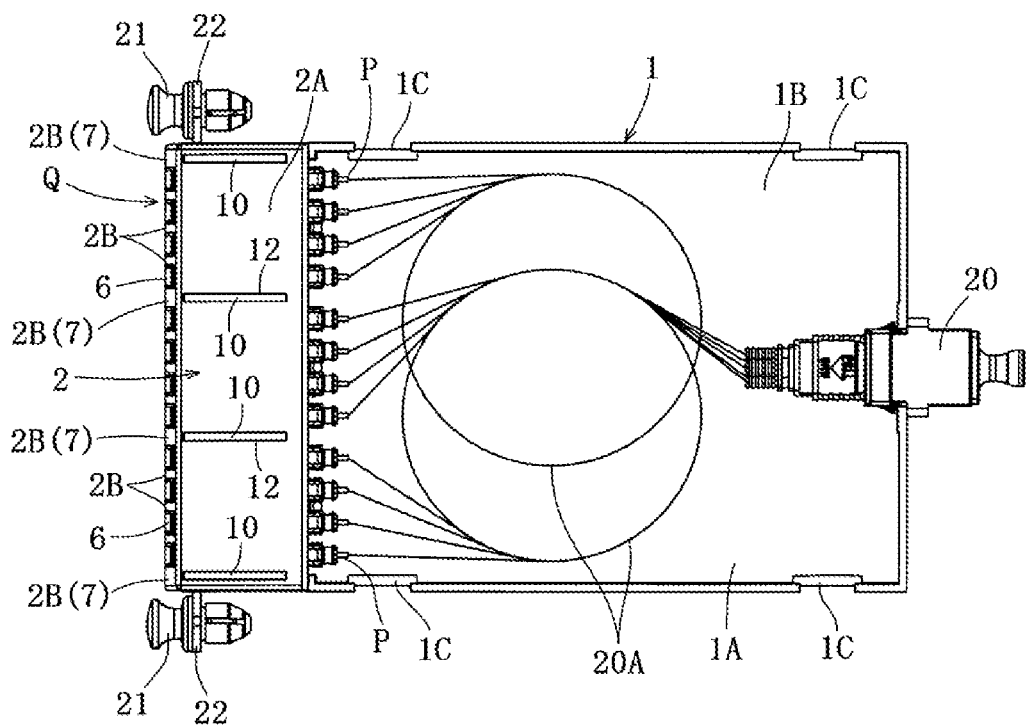
FIG. 16 is a plan view showing a state in which the optical fiber is housed in the cable accommodating portion for the optical fiber within the cassette case main body at the rear of the adapter main body.

As shown in FIGS. 1, 9 and 16, a concave portion 3C is formed in a center portion at the rear end of the case cover 3, an MPO adapter 20 is mated into the concave portion 3C, and an annular flange 22 into which a plate fixing latch 21 is inserted is provided in both sides at the front end of the case cover 3. Further, a plurality of optical fibers 20A are drawn from one MPO adapter 20, and are collected like a coil within the cable accommodating portion 18, and each of a plurality of plugs P connected to leading ends thereof is inserted into a rear portion of a plug insertion port 6 provided within the adapter main body 2 and mentioned later.

As shown in FIGS. 1, 4, 7, 8, 9 and 20, the adapter main body 2 is provided with an upper wall plate portion 2A, and a plurality of side wall plate portions 2B which are vertically placed at regular intervals so as to define a plurality of plug insertion ports 6 in both ends and inner sides of the upper wall plate portion 2A. A lower end of each of the side wall plate portions 2B is fixed to the upper surface at the front end of the bottom plate 1A in the case main body portion 1 of the cassette case. Therefore, an opening section 2C in a lower surface of each of the side wall plate portions 2B is closed, and a multiple type adapter Q according to the present invention is formed, the multiple type adapter Q being structured such that a plurality of adapter single bodies having an approximately quadrangular tubular shape in a front view are continuously provided in a lateral direction of the upper surface of the bottom plate 1A.

The adapter single body of the multiple type adapter Q is provided with a shutter 4 which has a spring 4A in an inner portion, a sleeve holder 5 in which end surfaces of a front holder portion 5A and a rear holder portion 5B are joined via a center split sleeve 5C, and a plug insertion port 6 for the optical connector.

Further, in the multiple type adapter Q, the upper wall plate portion 2A constructing the adapter main body 2 is formed into a rectangular plate shape approximately having the same width as a transverse width of the case main body portion 1, and a plurality of side wall plate portions 2B vertically placed in the rectangular plate shaped upper wall plate portion 2A and disposed in both the right and left ends and therebetween are formed as a plurality of coupling means fixing a lower end of each of the side wall plate portions 2B and the bottom plate 1A of the case main body portion 1 by a thick plate wall material 7 which can fit a coupling plate 10 thereto.

In the present embodiment, as shown in FIGS. 1, 7, 11, 12, 17 and 18, the thick plate wall material 7 is formed in a lower surface of the rectangular plate shaped upper wall plate portion 2A in such a manner that three ports are continuously disposed in a lateral direction, one port being constructed in the quadruple type adapter main body 2 via three side wall plate portions 2B which are thinner than the upper wall plate portion 2A. More specifically, two thick plate wall materials 7 are vertically placed in both right and left ends of the upper wall plate portion 2A and two thick plate wall materials 7 are vertically placed between the right and left ends at regular intervals. Further, three thin side wall plate portions 2B are vertically placed between four thick plate wall materials 7 which are adjacent to each other at distances. Thus, three ports of quadruple type adapter main bodies 2 each having four plug insertion ports 6 at regular intervals are formed. However, in the present invention, the adapter main body 2 is not limited to the quadruple type, and the total port number is not limited to three ports, but the adapter Q may be formed by employing the other adapter main body 2 than the quadruple type adapter main body and continuously disposing the other plurality of ports than three ports.

Figure 10A:
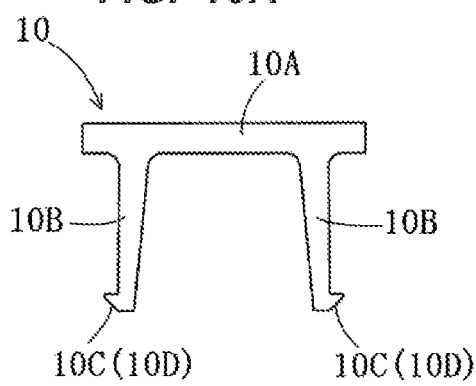
Figure 10B:
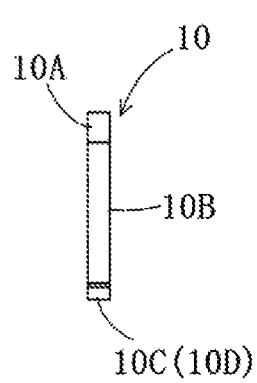
Figure 10C:
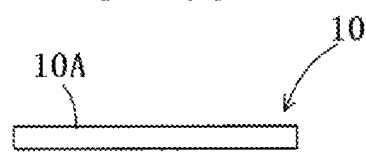
Figure 11:
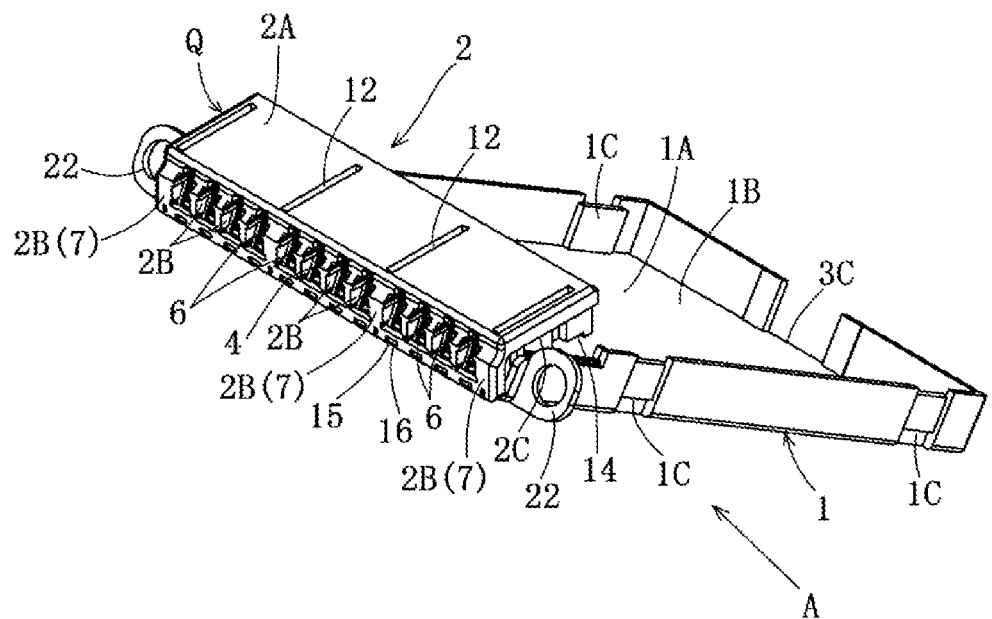
FIG. 11 is a perspective view showing a state in which a rib projection of the case main body portion is inserted into a mating hole of the adapter main body from a diagonally lower side so as to be mated thereto.
Figure 12:
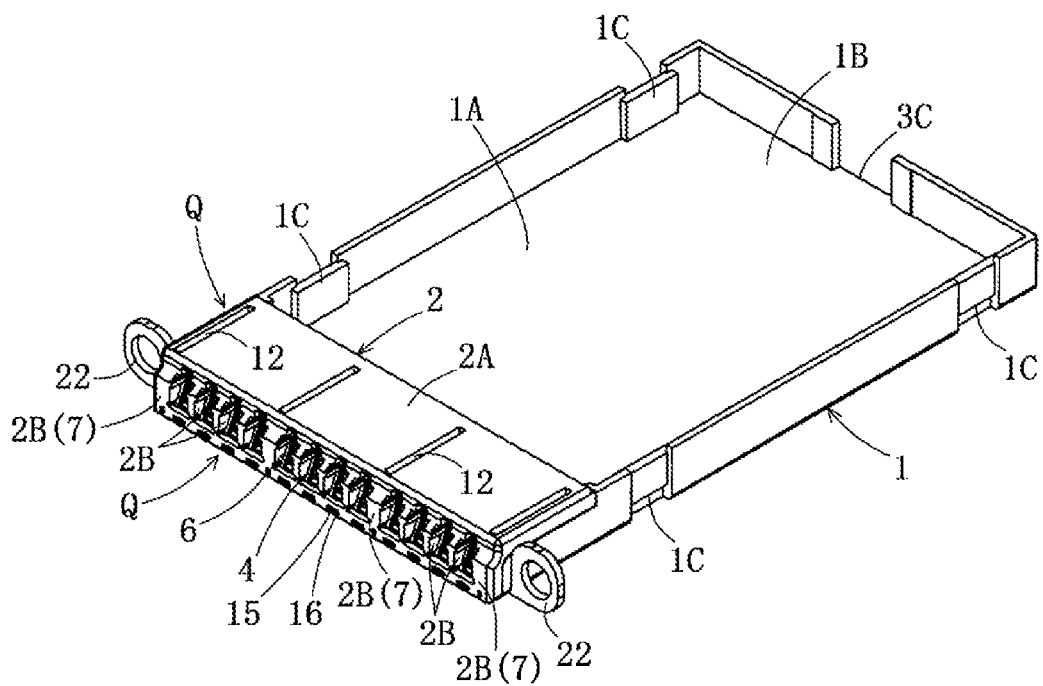
FIG. 12 is a perspective view showing a state in which the case main body portion is lifted up and fitted to the adapter main body horizontally.

The coupling plate 10 (coupling means) is provided in a lower side thereof with a locking portion 100 which fixes the lower end of the adapter main body 2 to the bottom plate 1A of the case main body portion 1. More specifically, as shown in FIGS. 10 and 15, the coupling plate 10 is formed into an approximately C-shaped form by a horizontal bar 10A and a pair of arms 10B and 10B vertically placed in front of both ends of the horizontal bar 10A, and is provided in lower ends of the pair of arms 10B and 10B with locking portions 100 each being formed by an outward locking claw 10D which is locked and fixed to a locking hole 11 of the bottom plate 1A in the case main body portion 1.

As shown in FIGS. 1, 4, 5, 6, 7, 9 and 17, an elongated opening 12 is formed directly above each of the thick plate wall materials 7 so as to be orthogonal to a length direction, the elongated opening 12 provided for pushing the coupling plate 10 to the rectangular plate shaped upper wall plate portion 2A from the above. Further, a fitting hole 13 of the coupling plate 10 is provided in a penetrating manner within each of the thick plate wall materials 7, the fitting hole 13 communicating with the opening 12 in a vertical disposition.

Figure 17A:
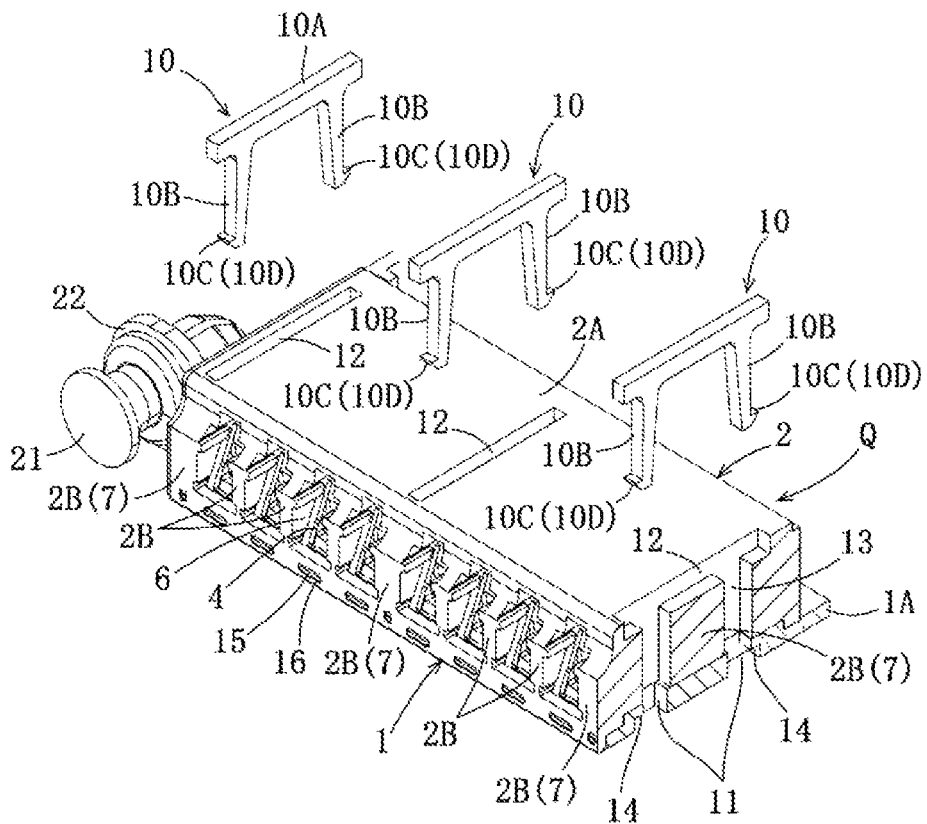
Figure 17B:
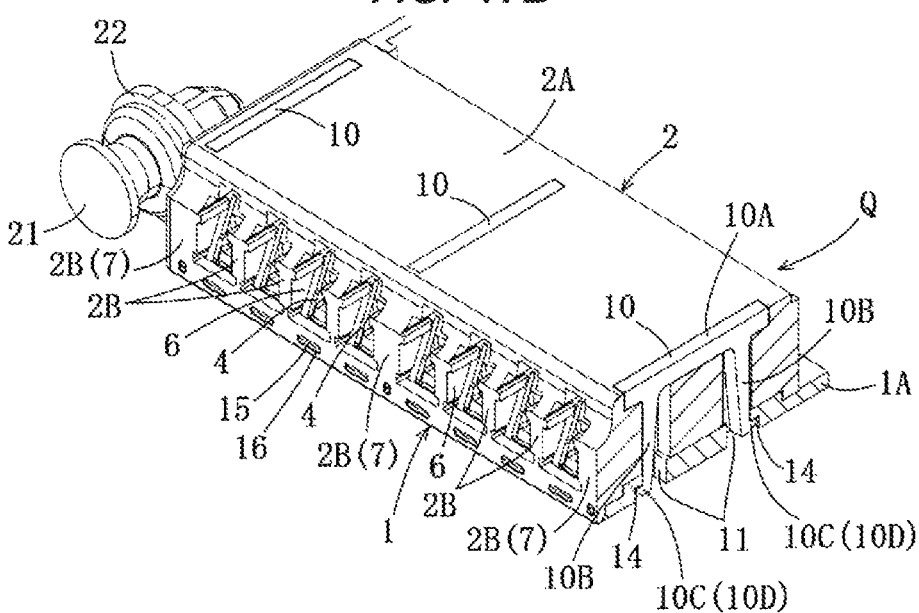
Figure 18:
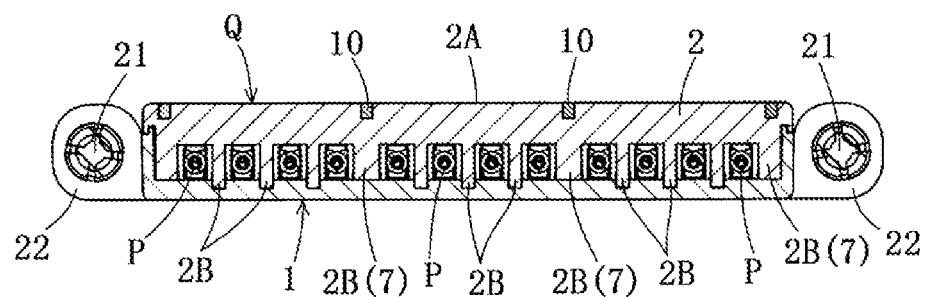
FIG. 18 is a cross sectional view of the adapter main body as seen from a back surface of the adapter main body.
Figure 19:
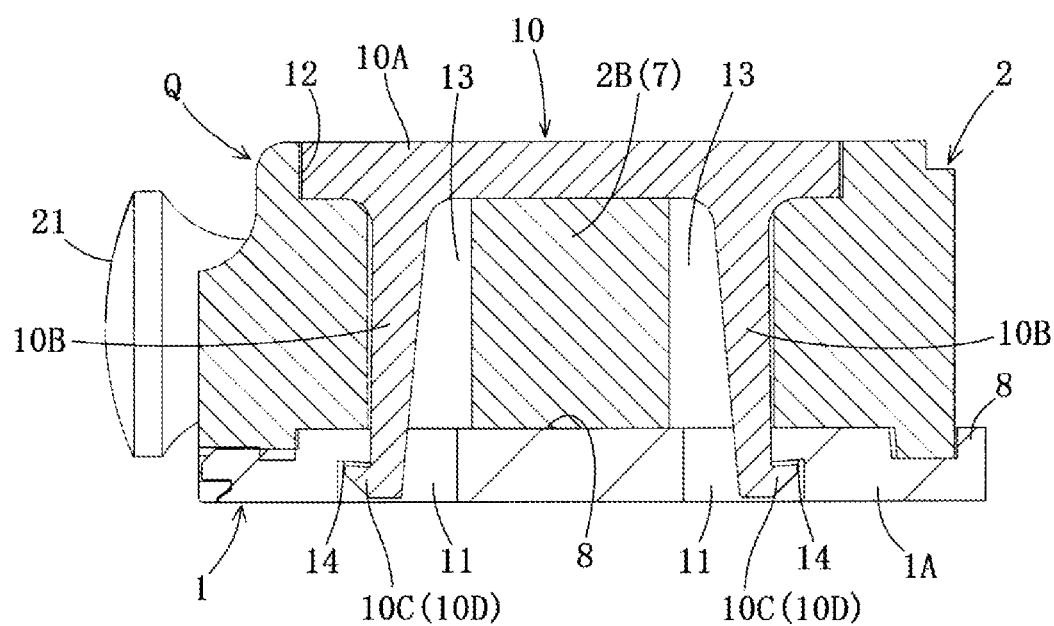
FIG. 19 is an enlarged cross sectional view showing a state in which the coupling plate (coupling means) is fitted to the fitting hole of the thick plate wall material in the adapter main body and locked to the bottom plate of the case main body portion.

As shown in FIGS. 15, 17 and 19, the locking hole 11 is formed in the bottom plate 1A of the case main body portion 1 in such a manner that the locking portion 100 in a lower side of the coupling plate 10 pushed to the fitting hole 13 of each of the thick plate wall materials 7 via the opening 12 of the upper wall plate portion 2A in the adapter main body 2 is locked and fixed thereto. Further, a step portion 14 is formed in the locking hole 11 in such a manner that the outward locking claw 100 constructing the locking portions 100 provided in the lower ends of a pair of arms 10B and 10B of the coupling plate 10 is locked and fixed thereto. The step portion 14 is formed into a step shape in a lower outer side of the locking hole 11, and is structured such that a flat surface portion of the outward locking claw 10D (constructed by a flat surface portion in an upper side and an inclined surface in a lower side) of the locking portion 10C below the coupling plate 10 is locked thereto.

Further, as shown in FIGS. 3, 4, 13 and 14, a board portion 8 mounting the adapter main body 2 is provided in a front upper surface of the bottom plate 1A in the case main body portion 1, and a plurality of mating grooves 8A in a lower end of each of the side wall plate portions 2B of the adapter main body 2 are provided at predetermined intervals in a transverse direction of an upper surface of the board portion 8. In the present embodiment, three mating grooves are provided so as to correspond to the number of the side wall plate portions 2B vertically placed between the thick plate wall materials 7. Thus, the adapter main body 2 can be mated to the bottom plate 1A of the case main body portion 1 at an accurate position when assembling, it is possible to prevent the adapter main body 2 on the board portion 8 provided in the front upper surface of the bottom plate 1A in the case main body portion 1 from being deviated, and the bottom plate 1A of the case main body portion 1 and the adapter main body 2 can be therefore fixed by the coupling plate 10 mentioned above securely, easily and firmly.

Figure 20:
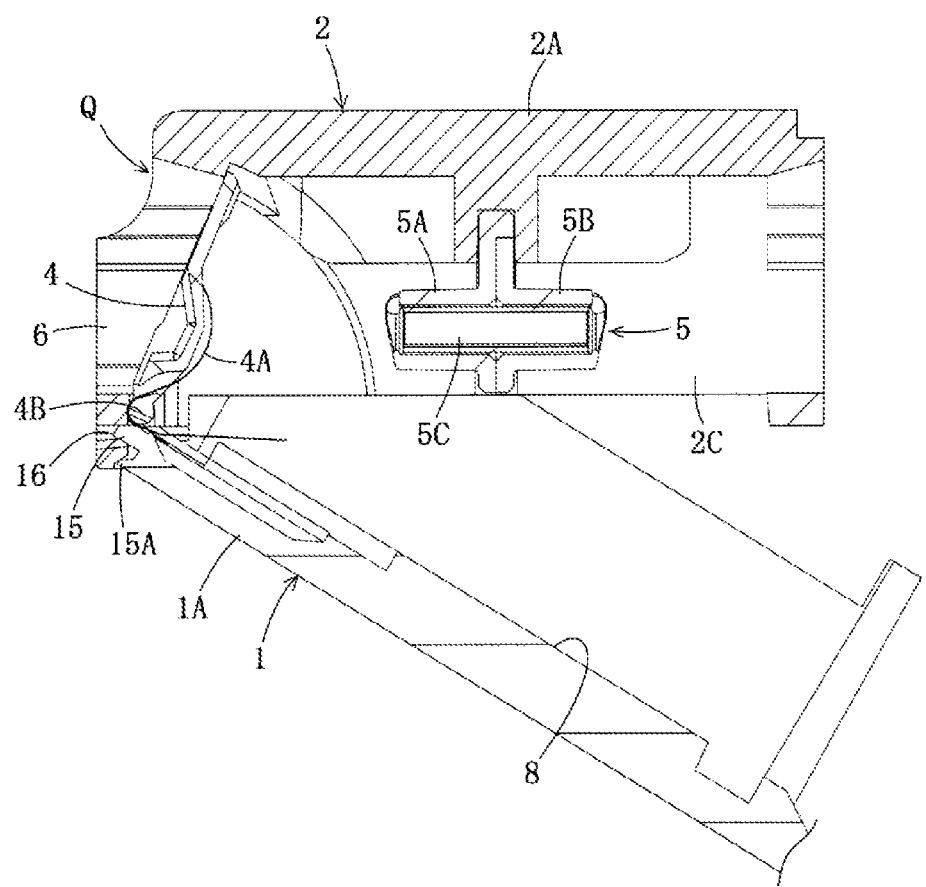
FIG. 20 is an enlarged cross sectional view of the adapter main body before assembling showing a state in which the rib projection of the case main body portion is inserted into the mating hole of the adapter main body from a diagonally lower side so as to be mated thereto.
Figure 21A:
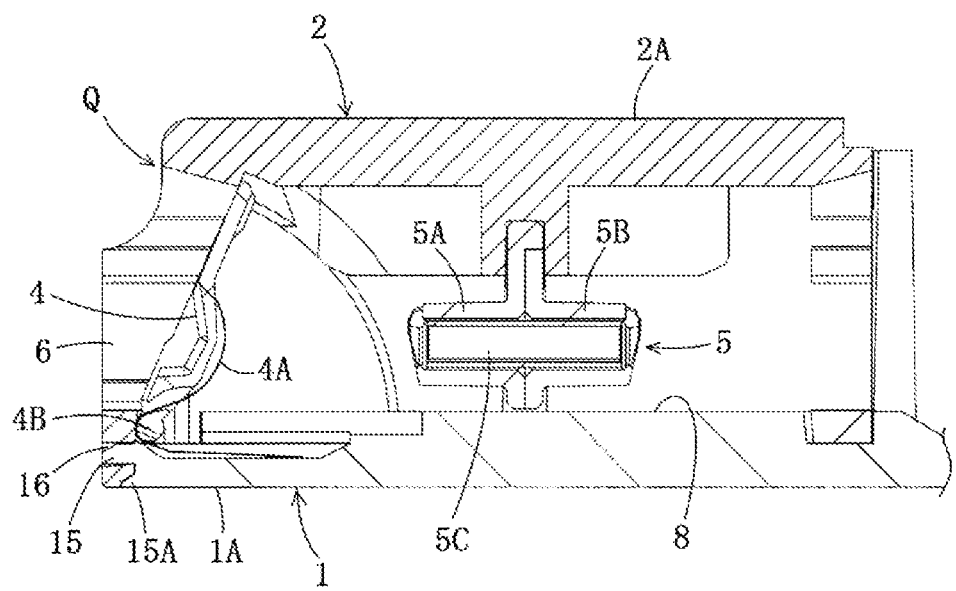
Figure 21B:
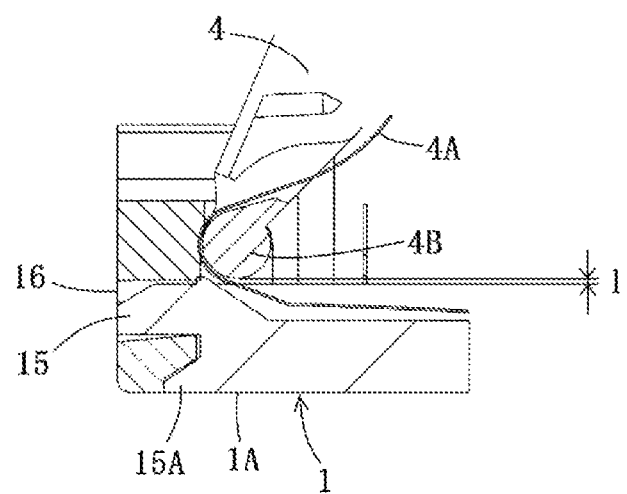

As shown in FIG. 20, and FIGS. 21A and 21B, a plurality of rib projections 15 are provided in a leading end of the bottom plate 1A of the case main body portion 1, and are formed so as to be integrated with the case main body portion 1 by mating the rib projections 15 to a plurality of mating holes 16 formed below a front end of the adapter main body 2 while pinching the sleeve holder 5 and the shutter 4 each built in the connector insertion ports 6.

At this time, as shown in FIGS. 11, 12, 13 and 14, the case main body portion 1 is inserted in such a manner as to mate the rib projection 15 to the mating hole 16 of the adapter main body 2. Next, the case main body portion 1 lifted up, and a plurality of holders 9 provided at the rear of the front upper surface of the bottom plate 1A in the case main body portion 1 are fitted to the rear end of the adapter main body 2. Thus, it is possible to fit the case main body portion 1 to the adapter main body 2 with a single touch. Therefore, it is possible to prevent the adapter main body 2 from being disconnected, and it is possible to correct the warpage of the bottom plate 1A in the case main body portion 1.

Figure 2A:
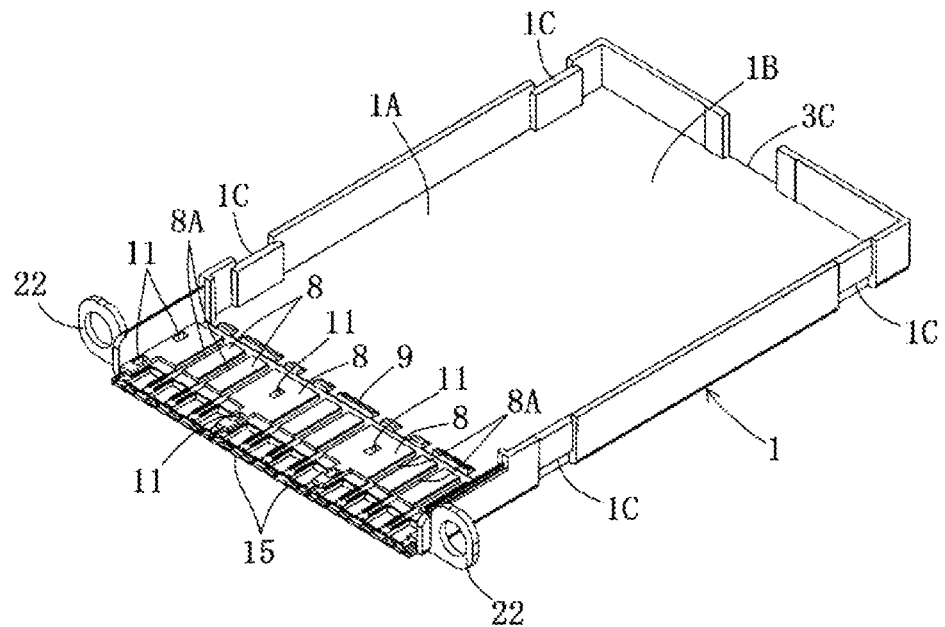
Figure 2B:
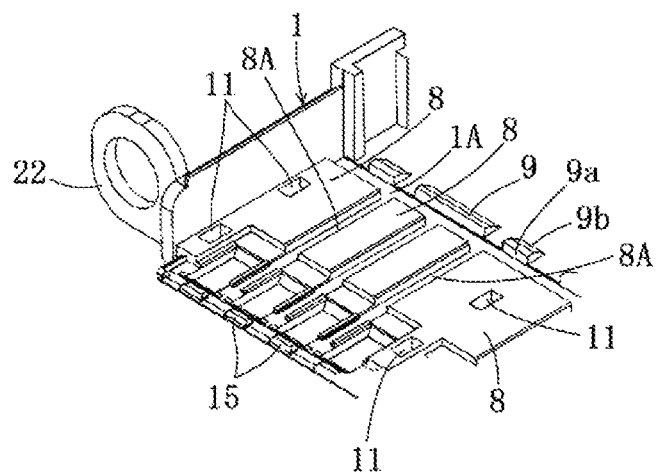
Figure 3A:
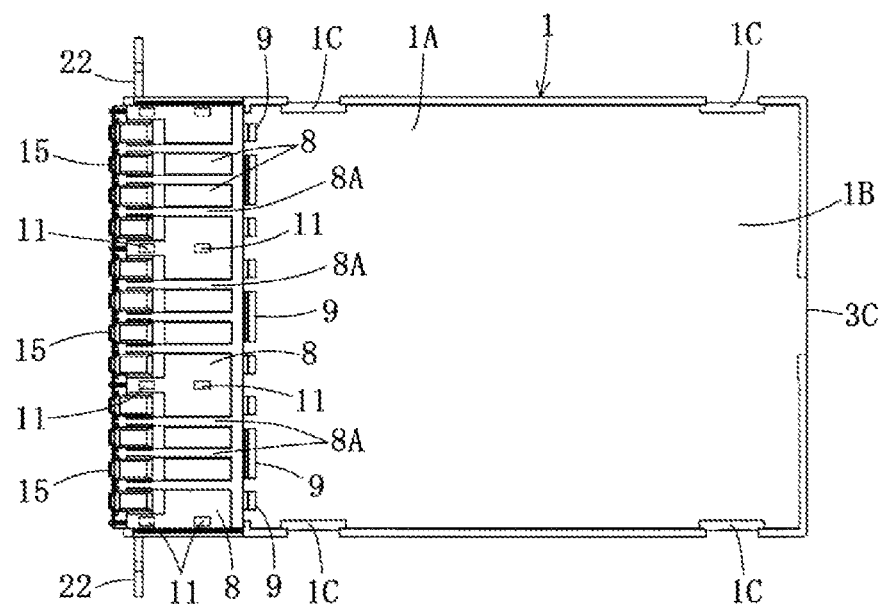
Figure 3B:
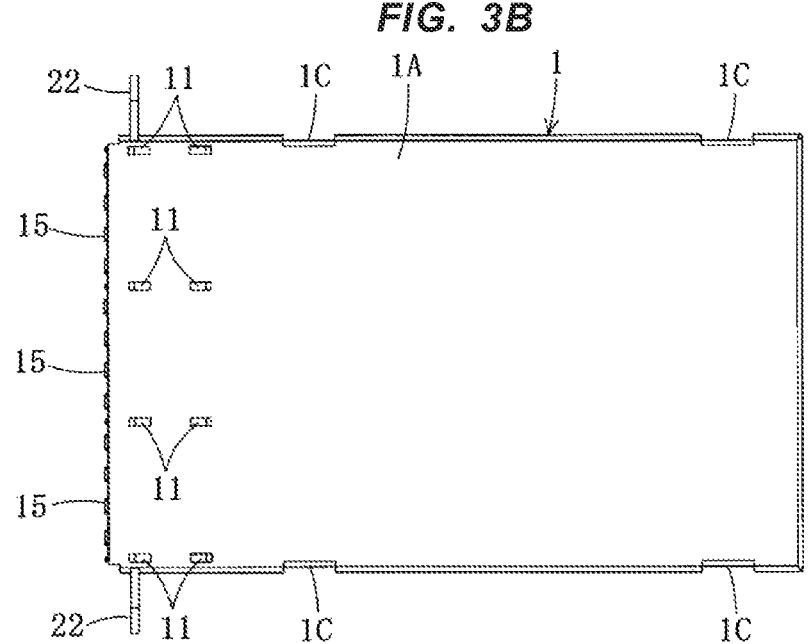
Figure 4A:
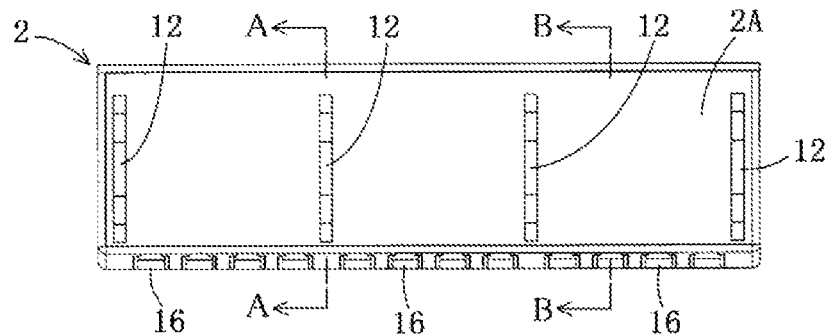
Figure 4B:
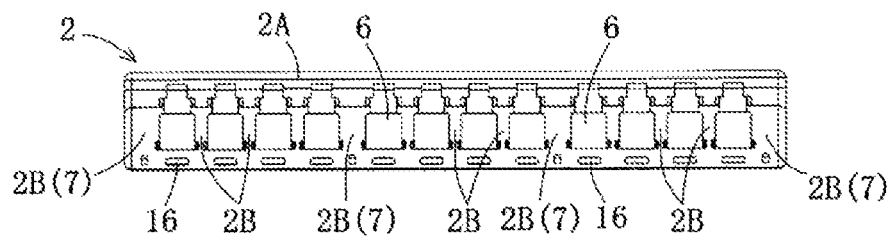
Figure 4C:
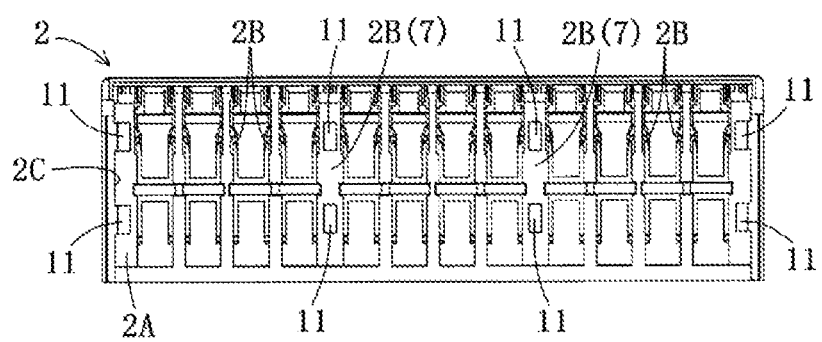
Figure 4D:
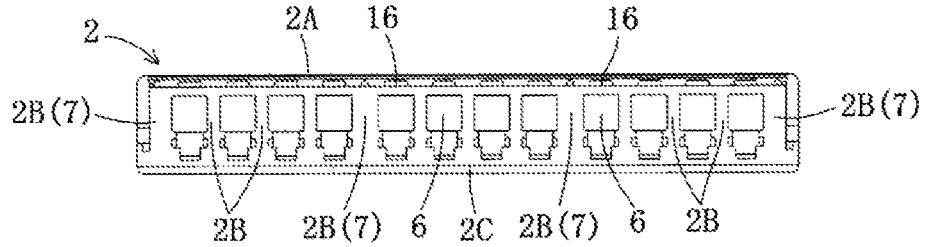
Figure 5A:
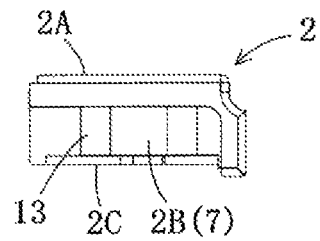
Figure 5B:
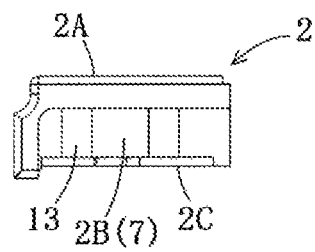
Figure 6A:
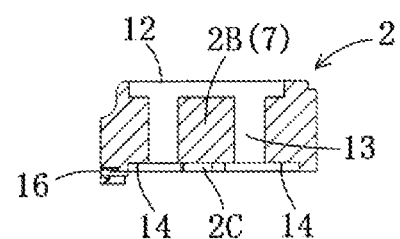
Figure 6B:
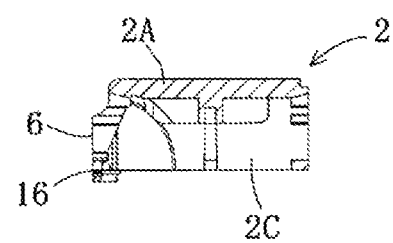
Figure 7A:
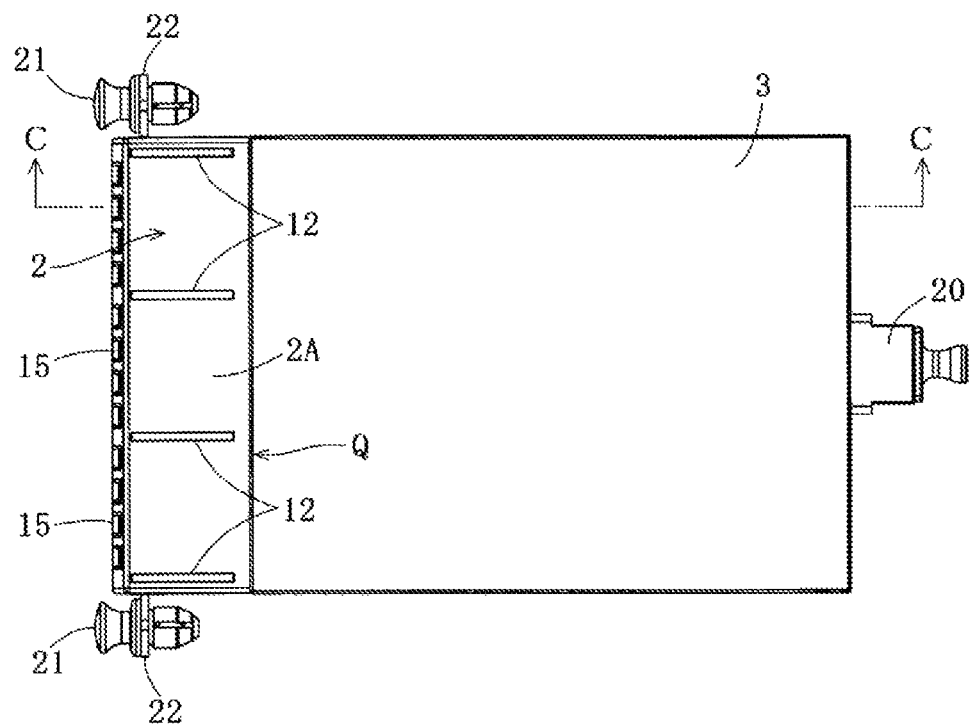
Figure 7B:
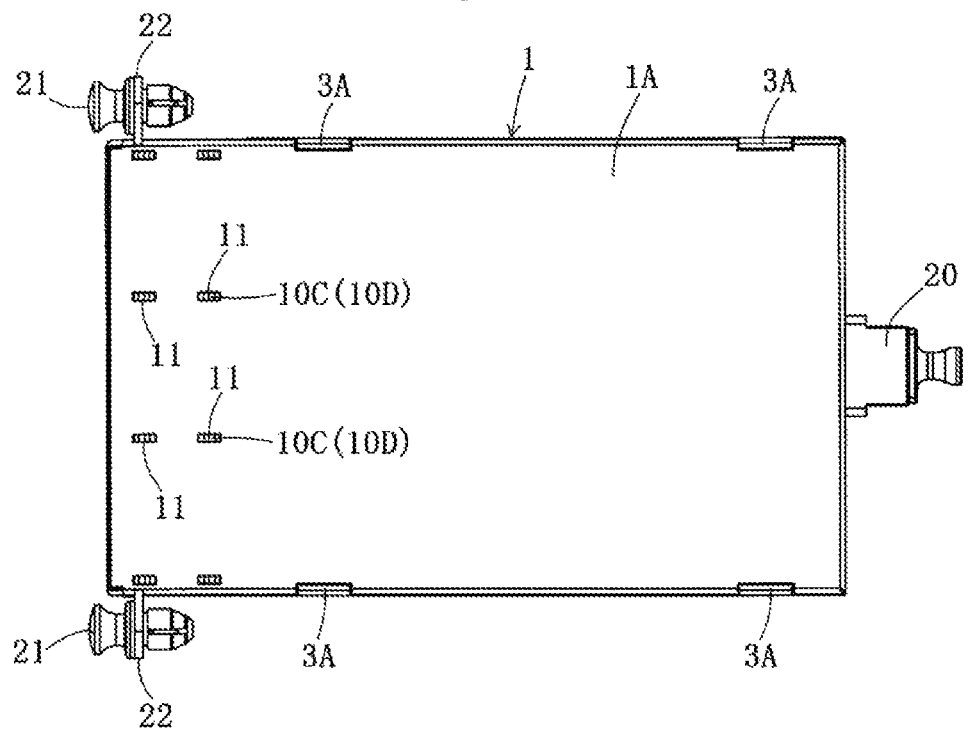
Figure 8A:
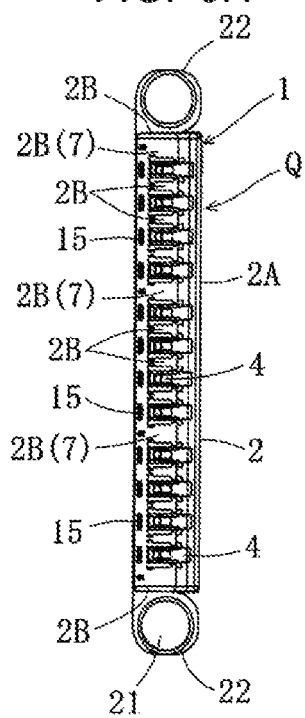
Figure 8B:
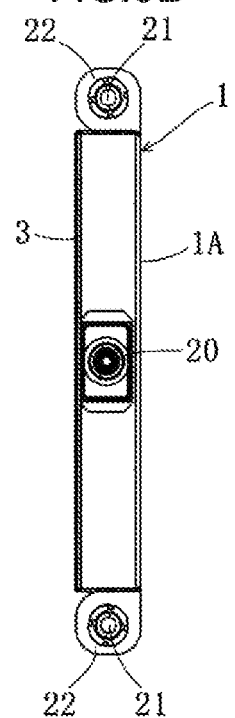
Figure 8C:
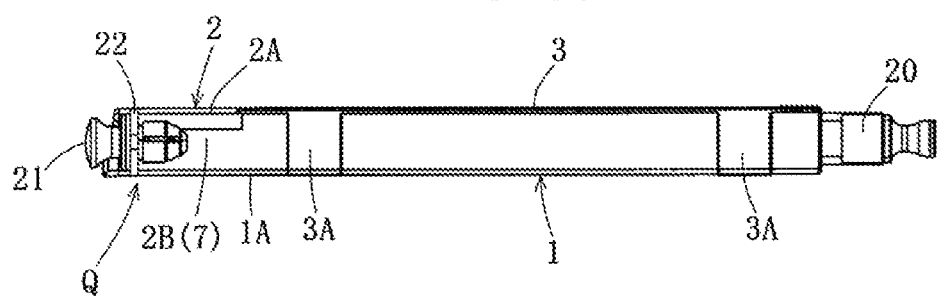

As shown in FIGS. 2A and 2B, the holder 9 is provided with a vertical surface 9a in a front end thereof and with an inclined surface 9b in a rear end thereof, respectively. In a narrow working field, it is preferable to attach the adapter main body 2 to the board portion 8 in front of the case main body portion 1 while sliding a bottom surface of the cable accommodating portion 1B in the case main body portion 1. More specifically, the rear end of the adapter main body 2 is locked to the vertical surface 9a when mounting the adapter main body 2 on the board portion 8 of the bottom plate 1A in the case main body portion 1 while climbing over the inclined surface 9b, and the adapter main body 2 can be therefore retained on the board portion 8 stably.

Figure 22A:
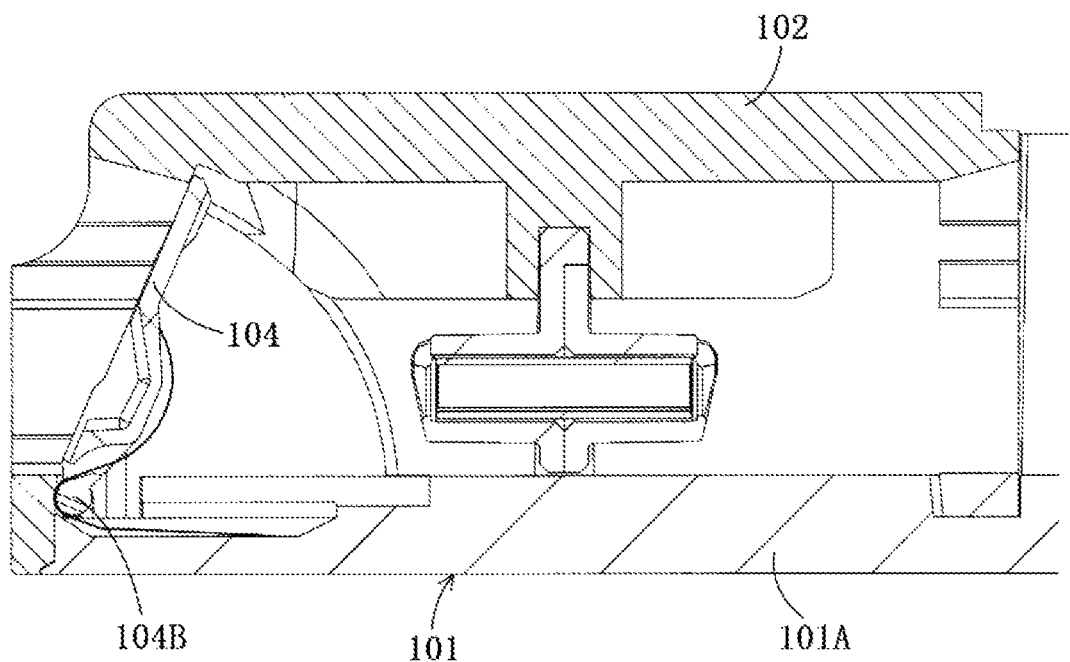
Figure 22B:
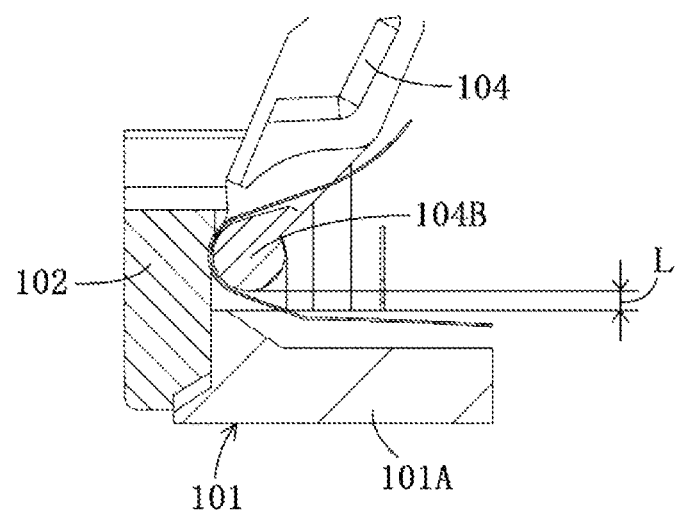

However, in the past, both members have been connected only by inserting a case main body portion 101 from a lower side of an adapter main body 102, as shown in FIGS. 22A and 22B. Therefore, a gap L between a shutter shaft 104B and a bottom plate 101A of the case main body portion 101 has been enlarged, and a bonding force between both the members has been weak, so that variation has been easily generated in an opening and closing degree of a shutter 104.

In the present embodiment, the second projection 15A is additionally provided below the rib projection 15, and the shutter can be locked in a receiving and holding manner to the lower side of the wall surface below the mating hole 16 below the front end of the adapter main body 2 as shown in FIGS. 21A and 21B. Thus, the adapter main body 2 is positioned, and a gap 1 between the inclined surface at the rear of the rib projection 15 and the shutter shaft 4B is reduced, thereby making the bonding force between both the members strong. Therefore, the position of the shutter shaft 4B can be stabilized, and the variation in the shutter opening and closing degree can be reduced.

The case main body portion 1 can be formed by an electrically conductive material such as a metal material as a whole of the cassette case including the case cover 3. Therefore, it is possible to manufacture a product having a high shielding performance for an electromagnetic noise.

Next, a description will be given of an example of assembly, use and operation as to the mode which is constructed as mentioned above.

Figure 13:
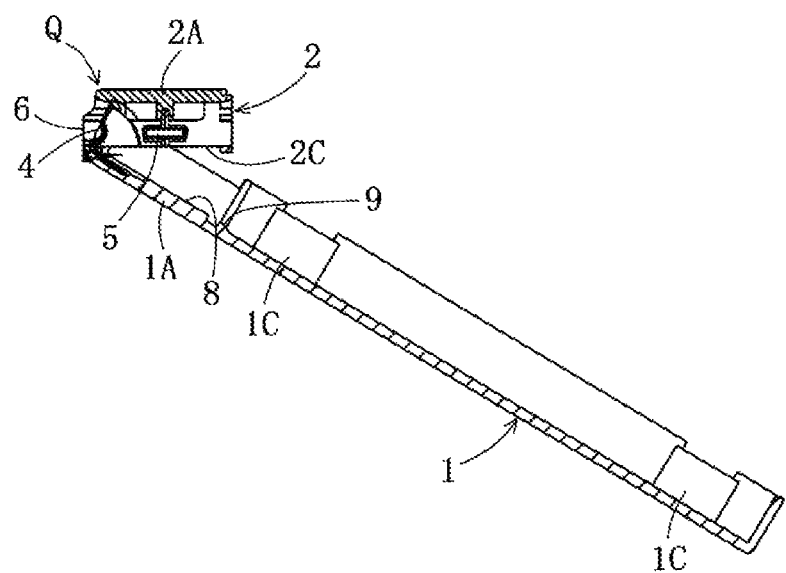
FIG. 13 is a cross sectional view as seen from a direction of an arrow A in FIG. 11.
Figure 14:
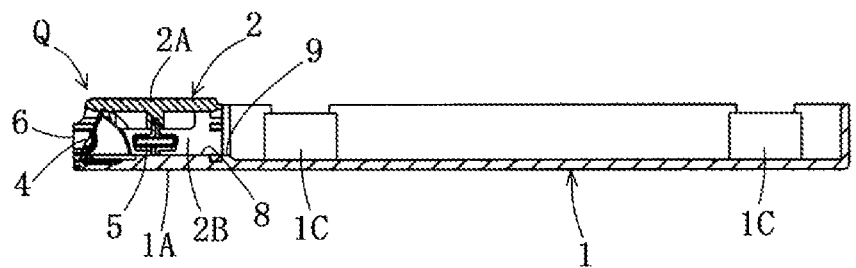
FIG. 14 is a cross sectional view along a line C-C in FIG. 7.

A plurality of rib projections 15 in the leading end of the case main body portion 1 are mated to a plurality of mating holes 16 formed in the lower side of the front end of the adapter main body 2 while pinching the members such as the sleeve holder 5 and the shutter 4 built in the adapter main body 2, thereby integrating with the case main body portion 1. At this time, as shown in FIGS. 13 and 14, the case main body portion 1 is inserted from the diagonal direction in such a manner as to mate the rib projection 15 to the mating hole 16 of the adapter main body 2, and the case main body portion 1 is lifted up and fitted to the adapter main body 2. At this time, the lower ends of a plurality of side wall plate portions 2B vertically placed in the upper wall plate portion 2A of the adapter main body 2 are mated and fixed to the mating grooves 8A in the upper surface of the board portion 8 which is provided in the front upper surface of the bottom plate 1A in the case main body portion 1.

Figure 15A:
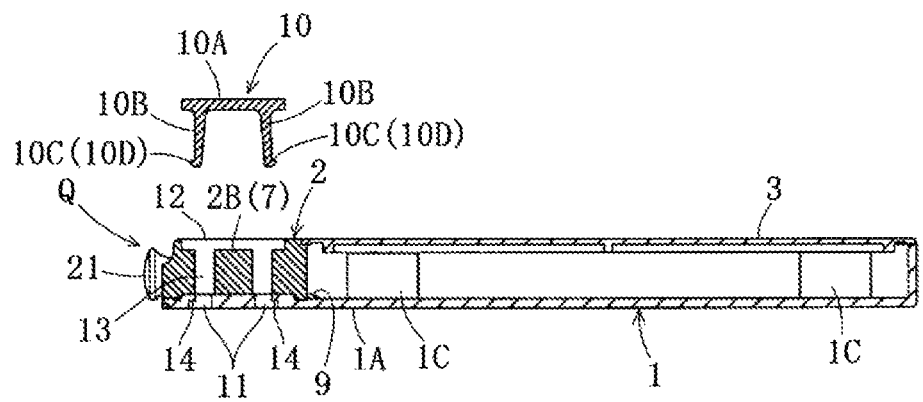
Figure 15B:
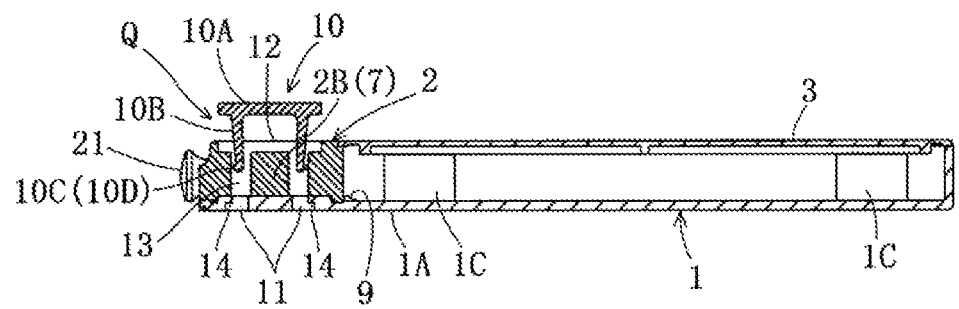
Figure 15C:
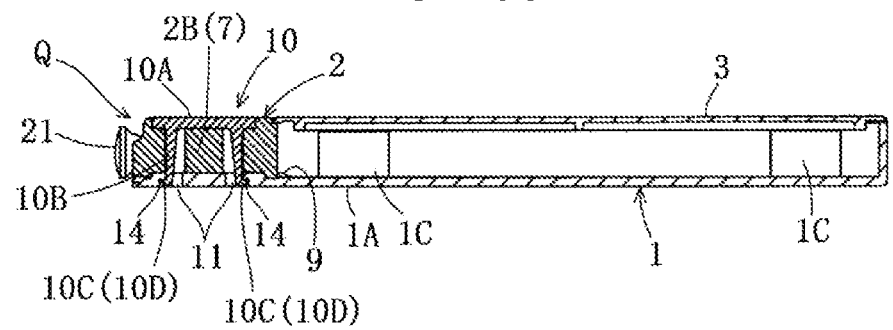

Next, as shown in FIGS. 15A, 15B and 15C, by pushing the coupling plate (coupling means) 10 to the elongated opening 12 in the upper wall plate portion 2A of the adapter main body 2 from the above, a pair of arms 10B and 10B vertically placed in front of both ends of the horizontal bar 10A of the coupling plate 10 are fitted into the fitting holes 13 communicating with the opening 12 in the vertical disposition in the inner portion of each of the thick plate wall materials 7, and the locking portion 10C each formed by the outward locking claw 10D provided in the lower ends of the arm portions 10B and 10B is locked to the step portion 14 in the locking hole 11 of the bottom plate 1A in the case main body portion 1. Thus, the adapter main body 2 and the case main body portion 1 are fixed without being disconnected, and the assembly of the cassette case with integrated adapter for the optical connector according to the present invention is finished.

The invention claimed is:

1. A cassette case with integrated adapter for an optical connector, comprising:
   an adapter main body; and
   a case main body portion of a cassette case, said case main body portion including a bottom plate,
   wherein the adapter main body includes an upper wall plate portion, and a plurality of side wall plate portions which are vertically placed at regular intervals in such a manner as to define a plurality of plug insertion ports in both ends and inner sides thereof,
   wherein the adapter main body is fixed to the bottom plate by a coupling means that extends through at least one opening in the upper wall plate portion of the adapter main body to engage the bottom plate and secure the adapter main body to the bottom plate,
   wherein a lower end of each of the side wall plate portions in the adapter main body is fixed to an upper surface of a front end of the bottom plate in the case main body portion of the cassette case, thereby forming a multiple type adapter in which a plurality of adapter single bodies are connected in a lateral direction of the upper surface of the bottom plate, the adapter single bodies having an approximately quadrangular tubular shape in a front view, and
   wherein a cable accommodating portion of an optical fiber is formed in a cassette case main body at the rear of the adapter,
   wherein the upper wall plate portion of the adapter main body is formed into a rectangular plate shape having approximately the same width as a transverse width in the case main body portion, and the plurality of side wall plate portions in both the right and left ends and between them vertically placed in the upper wall plate portion are formed by a thick plate wall material which can fit a plurality of the coupling means fixing an opening section of a lower surface in the adapter main body and a bottom plate of the case main body portion,
   wherein the coupling means employs a coupling plate which is provided in a lower portion thereof with a locking portion fixing each of the side wall plate portions of the adapter main body to the bottom plate of the case main body portion,
   wherein the coupling plate is pushed into the rectangular plate shaped upper wall plate portion through the at least one opening from a side of the device that is opposite the bottom plate, and
   wherein the at least one opening through which the coupling plate is pushed is formed just above each of the thick plate wall materials, and a fitting hole for the coupling plate is provided within each of the thick plate wall materials, the fitting hole communicating with the at least one opening in a vertical disposition.

2. The cassette case with integrated adapter for the optical connector according to claim 1, wherein a locking hole is provided in the bottom plate of the case main body portion, for locking and fixing a locking portion below a respective one of the coupling plate that has been pushed into the fitting hole of each of the thick plate wall materials via the opening of the upper wall plate portion.

3. The cassette case with integrated adapter for the optical connector according to claim 2, wherein the coupling plate is formed into an approximately π-shaped form by a horizontal bar and a pair of arms vertically placed in front of both ends of the horizontal bar, and is provided in lower ends of the pair of arms with a locking portion locked and fixed to the locking hole of the bottom plate in the case main body portion.

4. The cassette case with integrated adapter for the optical connector according to claim 3, wherein each of the locking portions in the lower ends of the pair of arms in the coupling plate is an outward locking claw.

5. The cassette case with integrated adapter for the optical connector according to claim 3, wherein a step portion is formed in the locking hole of the bottom plate in the case main body portion in such a manner that an outward locking claw provided in the lower ends of the pair of arms in the coupling plate is locked and fixed thereto.

6. The cassette case with integrated adapter for the optical connector according to claim 1, wherein a board portion mounting the adapter main body is provided in a front upper surface of the bottom plate in the case main body portion, and a plurality of mating grooves in the lower ends of the side wall plate, except in the thick plate wall-material of the adapter main body, are provided at predetermined intervals in a transverse direction of the upper surface of the board portion.

7. The cassette case with integrated adapter for the optical connector according to claim 1, wherein a plurality of rib projections are provided in a leading end of the case main body portion, and the rib projections are mated to a plurality of mating holes formed below a front end of the adapter main body and are formed to be integrated with the case main body portion.

8. The cassette case with integrated adapter for the optical connector according to claim 1, wherein the adapter is an adapter for SC type, MU type and MPO type optical connectors, or an LC type adapter.

9. The cassette case with integrated adapter for the optical connector according to claim 1, wherein the cassette case is formed by an electrically conductive material such as a metal material as a whole.

10. A cassette case with integrated adapter for an optical connector, comprising:
    an adapter main body; and
    a case main body portion of a cassette case, said case main body portion including a bottom plate,
    wherein the adapter main body includes an upper wall plate portion, and a plurality of side wall plate portions which are vertically placed at regular intervals in such a manner as to define a plurality of plug insertion ports in both ends and inner sides thereof,
    wherein the adapter main body is fixed to the bottom plate by a coupling means that extends through at least one opening in the upper wall plate portion of the adapter main body to engage the bottom plate and secure the adapter main body to the bottom plate,
    wherein a lower end of each of the side wall plate portions in the adapter main body is fixed to an upper surface of a front end of the bottom plate in the case main body portion of the cassette case, thereby forming a multiple type adapter in which a plurality of adapter single bodies are connected in a lateral direction of the upper surface of the bottom plate, the adapter single bodies having an approximately quadrangular tubular shape in a front view, and
    wherein a cable accommodating portion of an optical fiber is formed in a cassette case main body at the rear of the adapter,
    wherein a plurality of rib projections are provided in a leading end of the case main body portion, and the rib projections are mated to a plurality of mating holes formed below a front end of the adapter main body and are formed to be integrated with the case main body portion, and wherein second projections are continuously provided below the rib projections, and are formed in such a manner as to be locked in a receiving and holding manner below a wall surface that is lower than the mating holes of the adapter main body.

* * * * *